(12) United States Patent
Berdardini et al.

(10) Patent No.: US 6,574,360 B1
(45) Date of Patent: Jun. 3, 2003

(54) ACCELERATED OCCLUSION CULLING USING DIRECTIONAL DISCRETIZED OCCLUDERS AND SYSTEM THEREFORE

(75) Inventors: Fausto Berdardini, Hartsdale, NY (US); Jihad El-Sana, Stony Brook, NY (US); James T. Klosowski, Rye, NY (US); David Luebke, Charlottesville, VA (US); Jai Menon, Croton-on-Hudson, NY (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/359,856

(22) Filed: Jul. 23, 1999

(51) Int. Cl.$^7$ .......................... G06K 9/36; G06F 15/00; G06G 5/00
(52) U.S. Cl. .................. 382/154; 382/282; 382/285; 382/291; 345/419; 345/653
(58) Field of Search .................. 382/154, 226, 382/227, 282, 283, 284, 285, 293, 294, 295, 296, 298, 171, 190, 206, 251, 253, 279, 287, 291; 345/420, 428, 423, 421, 419, 424, 653, 664

(56) References Cited

U.S. PATENT DOCUMENTS

| | | | | |
|---|---|---|---|---|
| 4,865,423 A | * | 9/1989 | Doi .......................... 350/320 |
| 5,579,455 A | * | 11/1996 | Greene et al. .............. 392/122 |
| 5,600,763 A | * | 2/1997 | Geene et al. ............... 395/120 |
| 5,999,187 A | * | 12/1999 | Dehmlow et al. .......... 345/420 |
| 6,075,538 A | * | 6/2000 | Shu et al. ................... 345/419 |
| 6,088,035 A | * | 6/2000 | Sudarsky et al. .......... 345/421 |
| 6,414,680 B1 | * | 6/2002 | Klosowski et al. ......... 345/423 |

* cited by examiner

Primary Examiner—Jayanti K. Patel
Assistant Examiner—Yosef Kassa
(74) Attorney, Agent, or Firm—Charles W. Peterson, Jr.; Louis J. Percello

(57) ABSTRACT

An occlusion culling method for image processing and system therefor. The culling method first determines which polygons are hidden, or occluded, by other objects. These hidden or occluded polygons will not contribute to the final scene and, therefore, need not be rendered. In the first major step, the input models are preprocessed to build a hierarchical data structure which is as an approximation to the input models. Simple polygonal occluders are determined for substitution in place of the complex image geometry in successive visibility queries. Once the first preprocessing step is complete, the second step may be executed at run-time, while a user is inspecting, or visualizing, the input. In the second step, the occluders, determined in the first step, are used to selectively forego rendering shapes or shape portions that are unseen from the current viewpoint.

27 Claims, 14 Drawing Sheets

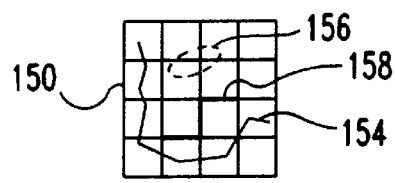
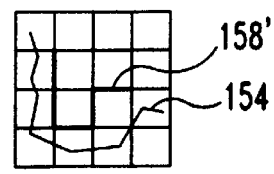
FIG.4A          FIG.4B
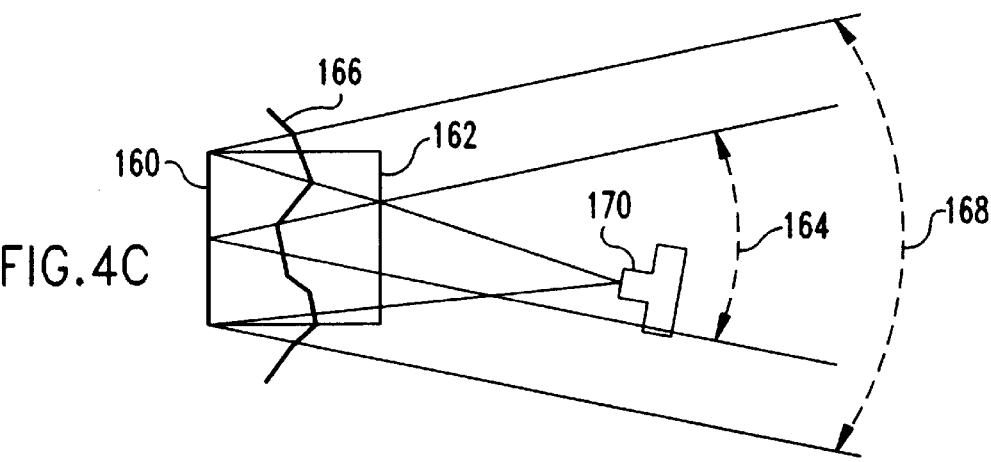
FIG.4C
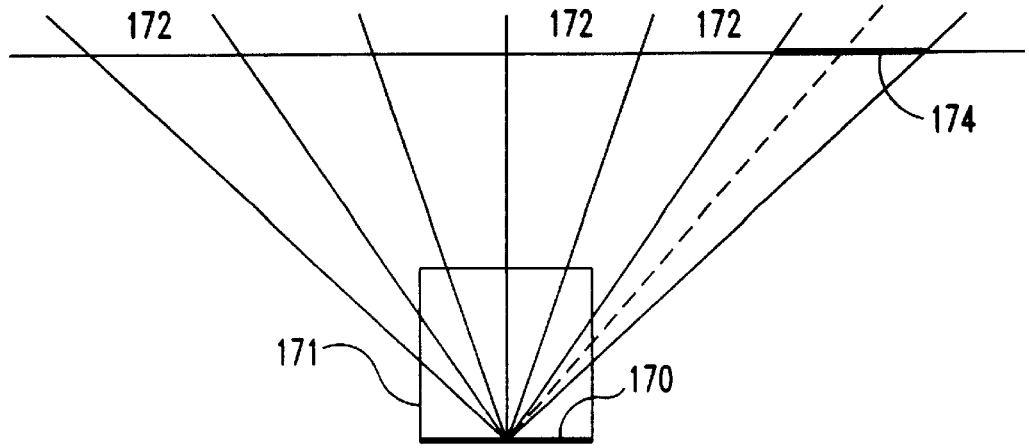
FIG.4D

ACCELERATED OCCLUSION CULLING USING DIRECTIONAL DISCRETIZED OCCLUDERS AND SYSTEM THEREFORE

BACKGROUND OF THE INVENTION

1. Field of the Invention

The present invention relates to the field of computer image processing, and more specifically, selectively rendering objects in a scene in image processing systems.

2. Background Description

State of the art computer aided design (CAD) uses very complex models of objects, wherein each model may include a large number of polygons, that represent physical structures. Interactive visualization of these large polygonal models, places an enormous burden upon the current graphics hardware and makes image rendering very complex and time consuming. This complexity makes it impossible to render at interactive rates with state of the art hardware, especially when interactively rendering large 3D models and is a well known problem in the art. Consequently, numerous methods have been proposed to reduce, or cull, the number of polygons that are rendered for a particular viewpoint and scene model.

for example, one such approach, view frustum culling, does not render any polygons lying completely outside of the viewer's field of view. Similarly, for rendering solid objects, those polygons that are facing away from the viewpoint (i.e., the back-facing polygons) may be omitted for rendering. Accordingly, a potentially greater reduction in the number of polygons that must be processed might be realized by culling away those geometric portions of the scene or shapes therein that are occluded from view by other objects in the forefront of the scene.

Another approach to this problem is discussed by S. Teller & C. Sequin in "Visibility Preprocessing for Interactive Walkthroughs," *SIGGRAPH* 1991 *Conference Proceedings*, ACM Press, 1991, pp. 61–69. Teller & Sequin's approach has been to break the input model down into "cells" and "portals". Cells have boundaries coinciding with opaque surfaces, while portals represent non-opaque surfaces between the cells. An adjacency graph is constructed to connect the cells via portals. Then, the adjacency graph is utilized to determine the cell-to-cell visibility and the potentially visible set (PVS) of polygons for each cell. Unfortunately, the Teller & Sequin approach has been presented, typically, within a framework of architectural models wherein cells (e.g., floors, rooms, hallways) and portals (e.g., doors, windows) are easily defined. Teller & Sequin do not address more complicated scenarios, such as rendering general, large 3D models at interactive rates.

yet another approach is discussed by S. Coorg & S. Teller in "Temporally Coherent Conservative Visibility," *Proceedings*, 12*th Annual ACM Symposium of Computer Geometry*, 1996, 78–87. Coorg & Teller also precompute a superset of the visible polygons when the viewpoint is within a particular region of space. As the viewpoint moves, the Coorg & Teller method tracks only those events that cause changes in the polygons visible from the current viewpoint, termed "visual events" by Coorg & Teller. Unfortunately, the Coorg & Teller method considers only a single polygon as an occluder. Coorg & Teller rely on the model to include large occluders. However, the Coorg & Teller method does not handle scenes with an absence of large occluders or objects being occluded by multiple smaller objects well.

N. Greene, M. Kass and G. Miller in "Hierachical Z-Buffer Visibility," *SIGGRAPH* 93 *Conference Proceedings*, ACM Press, 1993, pp. 273–278, teach a Hierarchical Z-buffer (HZB) that extends the traditional Z-buffer by maintaining what is termed an "image Z pyramid" to quickly reject hidden geometry. A second data structure, an octree, is built upon the geometry in object-space. At runtime, the octree is traversed with each node of the tree being queried against the current HZB. If a current node is determined to be behind previously visible geometry, then the current octree node can be skipped, together with all children of the skipped node and the geometry associated with children. Otherwise, as the image geometry is rendered, new z values are propagated for the current node through the HZB, as well as for the children of the current node. Unfortunately, to achieve interactive rendering rates, the HZB approach requires special graphics hardware to make the necessary queries and updates against the HZB.

Yet another approach, similar to the HZB approach, is the Hierarchical Occlusion Maps (HOM) of H. Zhang, D. Manocha, T. Hudson and K. E. Hoff III, "Visibility Culling using Hierarchical Occlusion Maps," *SIGGRAPH* 97 *Conference Proceedings*, ACM Press, 1997, pp. 77–88. The HOM approach is similar to the HZB in using both object and image space hierarchies. Initially, the HOM image spaces are built by rendering shapes with a high potential for occluding, i.e., shapes that are very close to the current viewpoint. To determine visibility of the remaining shapes, the object space hierarchy is traversed while checking each node against a hierarchical occlusion map, using, if necessary, a conservative depth test to determine occlusion. However, the HOM approach requires initially selecting occluders to be rendered at each viewpoint. Further, to accelerate HOM shape construction, the HOM approach requires special graphics hardware to support bilinear interpolation of texture maps.

Thus, there is a need for efficiently selecting portions of geometry to be rendered in an image processing system that does not require special graphics hardware.

SUMMARY OF THE INVENTION

It is a purpose of the invention to improve image rendering in image processing systems;

It is another purpose of the invention to improve efficiency in selecting image portions rendered in an image processing system;

It is yet another purpose of the invention to improve selecting scene portions that are rendered and identifying occluded scene portions that are not rendered, thereby improving system efficiency;

It is yet another purpose of the invention to minimize scene geometry rendered while producing an image that is visually indistinguishable with the image resulting from rendering all of the scene geometry.

The present invention is a technique of occlusion culling and system therefor. The culling method of the present invention first determines which polygons are hidden, or occluded, by other objects. These hidden or occluded polygons will not contribute to the final scene and, therefore, need not be rendered. The present invention includes two major steps. In the first major step, the input models are preprocessed to build a hierarchical data structure which is used as an approximation to the input models. In this first step, simple polygonal occluders are determined for substitution in place of the complex image geometry in successive visibility queries. Once the first preprocessing step is complete, the second step may be executed at run-time, while a user is inspecting, or visualizing, the input. In the second step, the occluders, determined in the first step, are used to forego rendering shapes or shape portions that are unseen from the current viewpoint.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A–D show an example determining directional discretized occluders (DDO) that are used in creating a view dependent piece-wise linear approximation of geometric objects (e.g. surfaces) in a scene;

DETAILED DESCRIPTION OF A PREFERRED EMBODIMENT OF THE INVENTION

Figure 1:
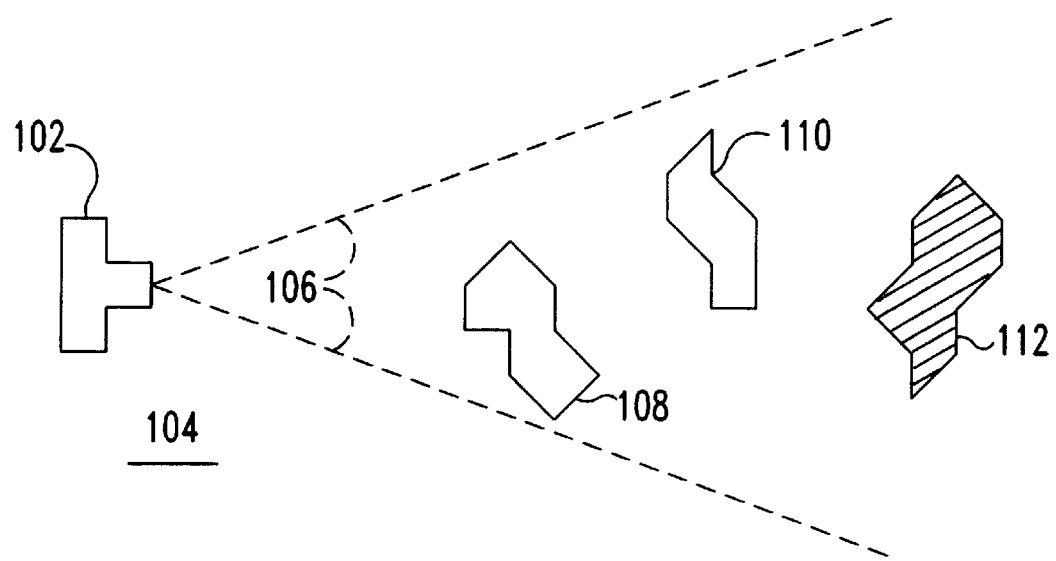
FIG. 1 is an illustration of the occlusion culling problem addressed by the preferred embodiment of the present invention.

The preferred embodiment of the present invention can best be understood with reference to the arrangement 100 of FIG. 1. In the arrangement 100 a camera 102 at the viewer position 104 views a three dimensional (3D) scene through a view frustum 106, which is also referred to herein as an image volume. Scene objects 108 and 110 in the forefront occlude object 112 (the occludee) from current viewer position 104. Thus, occluded object 112 need not be rendered by computer image processing system rendering the scene as a two dimensional (2D) image. Further, posterior aspects of occluder objects 108, 110, as well as partially occluded features of object 110, need not be rendered. By omitting rendering unnecessary (occluded) scene objects and features, the image processing time is reduced, sometimes dramatically.

Thus, the present invention is an occlusion culling process or method and system for video imaging scenes such as that in the example of FIG. 1 that includes two major steps or phases. In the first or preprocessing step or phase, Directional Discretized Occluders (DDOs) are determined. In the second step, a run-time step or phase, the occluders are utilized to perform occlusion culling.

The present invention avoids the complexity of visibility tests for a large collection of polygons, which is extremely time consuming for prior art approaches. When rendering complex scenes, such as that of the example of FIG. 1, preferably, geometric shapes are rendered in order according to each shape's closeness to the viewer, i.e., rendering the foremost geometric shapes 108 first and the farthest geometric shapes 112 last. Using such a front-to-back order, objects 112 that are completely hidden by objects already rendered, are not rendered. The preferred embodiment of the present invention, therefore, substitutes very simple objects for the complex collection of geometric shapes, simplifying occlusion culling queries. Thus, larger more complex scenes are simplified and may be processed at real-time rates.

Figure 2A:
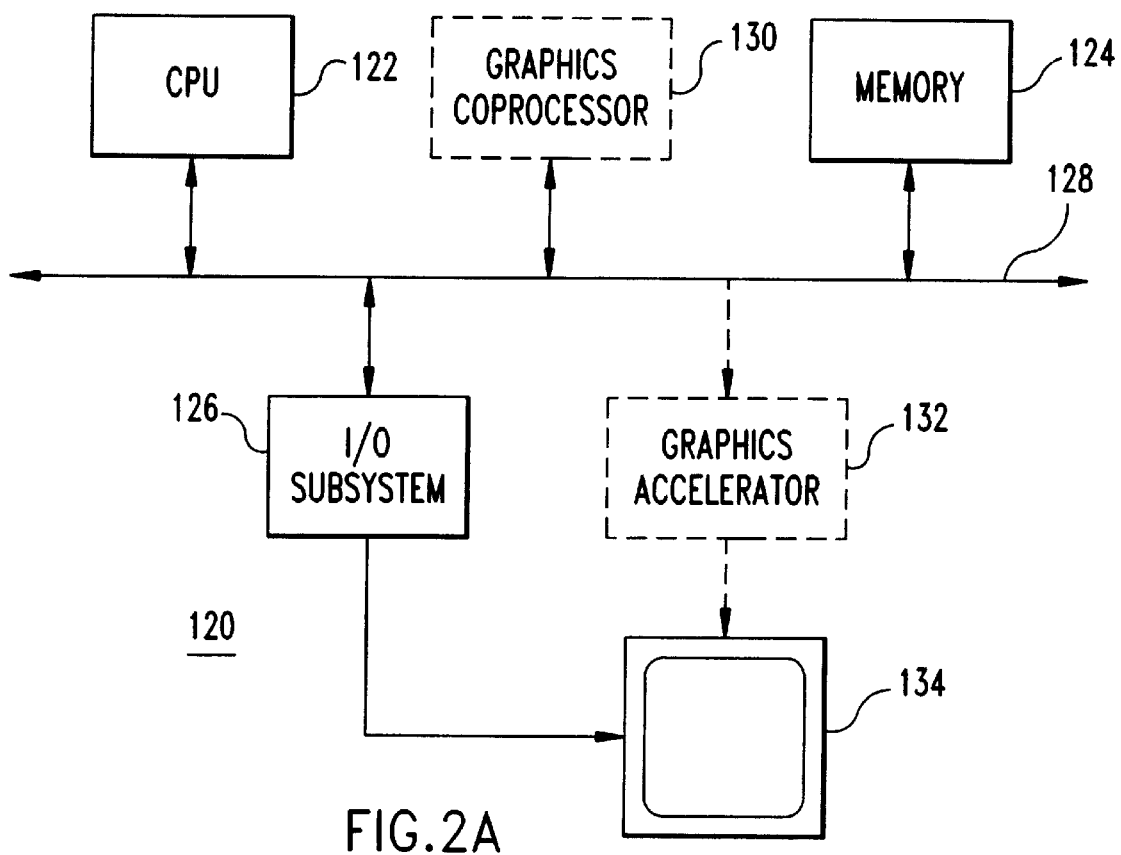
FIGS. 2A–B show a first preferred embodiment image processing system.

FIG. 2A is a block diagram of a preferred embodiment image processing system 120 that includes, as a minimum, a Central Processing Unit (CPU) 122, a memory subsystem 124 and an Input Output (I/O) subsystem 126, all communicating through a data bus 128. Optionally, the system 120 may include a graphics coprocessor 130 to offload graphics processing from the CPU 122, thereby reducing CPU computation-intensive tasks. Additionally, the preferred embodiment system 120 may include an optional graphics accelerator subsystem 132. Processed images are visualized on display 134.

Figure 2B:
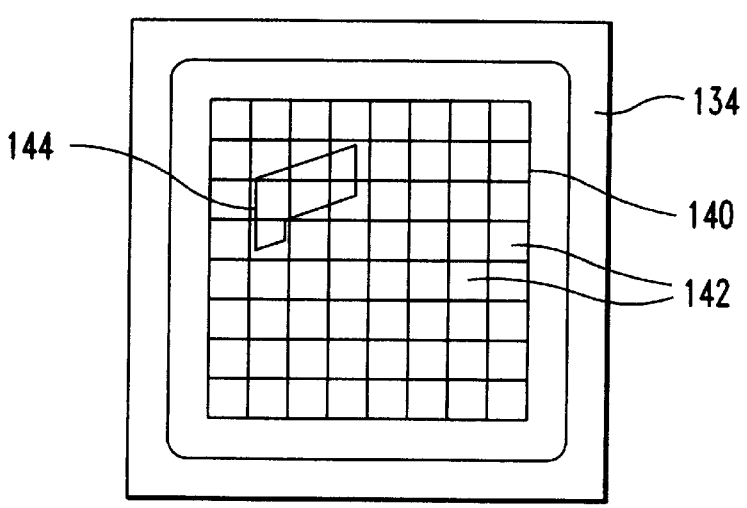

FIG. 2B is an example of an image rendered on display 134. The display area 140 is subdivided into display cells 142, normally referred to as pixels. A primitive 144, shown on the display 134, is a portion of the displayed three-dimensional scene. The primitive 144 is projection of a three-dimensional primitive onto two-dimensional display area 140 "image space." In this example, the projection of the primitive 144 occupies a portion of seven pixels 142.

Figure 3:
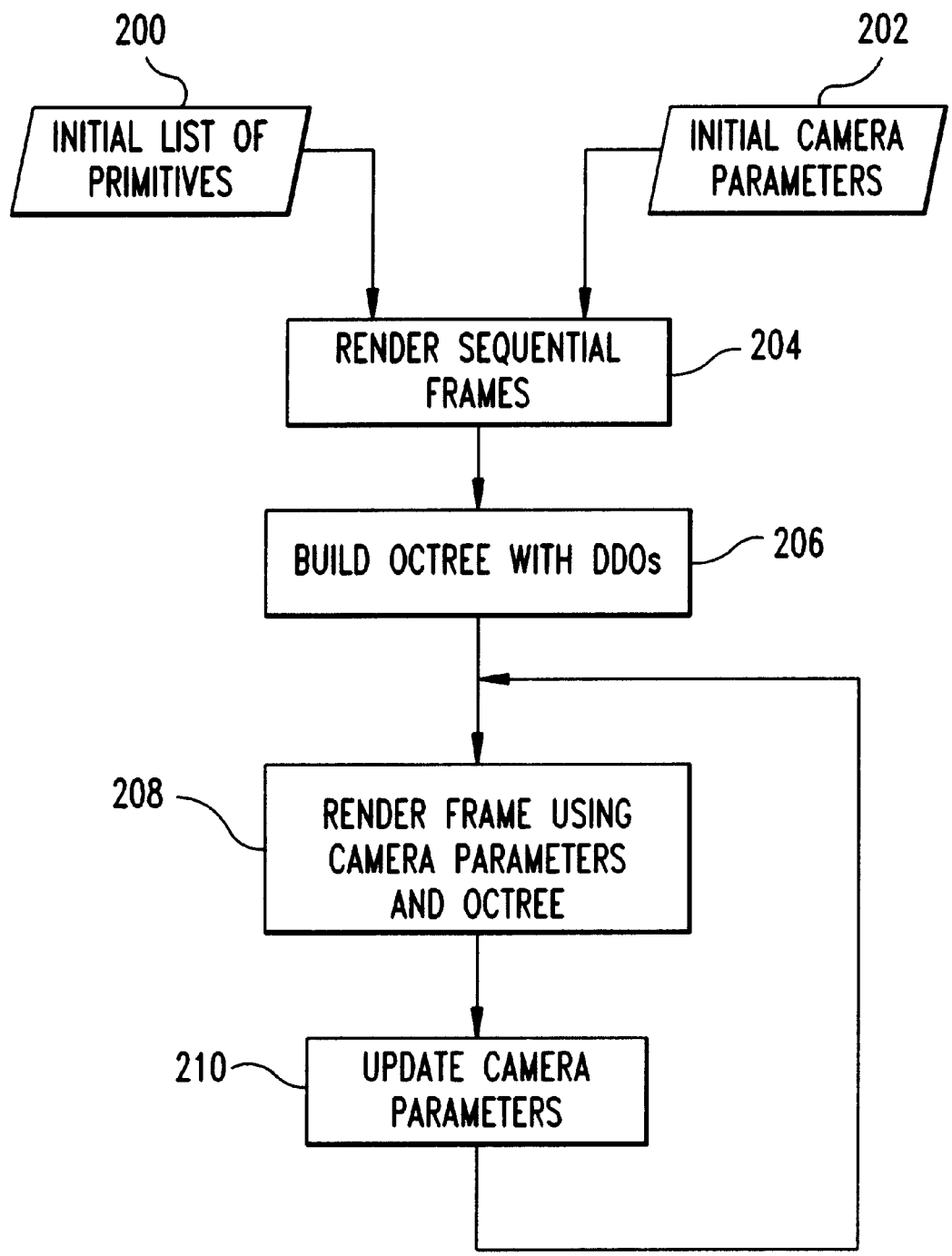
FIG. 3 is a flow chart of the preferred embodiment occlusion culling process.

FIG. 3 is a flow chart of the preferred embodiment occlusion culling process of the present invention as executed on a preferred embodiment system 120. An initial list 200 of geometric primitives (e.g. triangles) and initial camera parameters 202 are provided as objects of a three dimensional scene, for example 100, to geometric rendering process input 204. Then, executing the first major step 206, which is a preprocessing step, the raw geometric data is converted into an octree data structure with associated occlusion information. Next, in the second major step 208, the image geometry is rendered from the current camera position. Occlusion information computed by process 206 is used to identify occluded geometry, which is not rendered in step 208. Finally, the camera parameters are updated in step 210 and, the next frame may be rendered.

FIG. 4A shows Directional Discretized Occluders (DDOs) in a two-dimensional example. The description hereinbelow is with reference to two dimensions for ease of illustration only and is not intended as a limitation. Further, extending the description to three dimensions would be trivial for a person of ordinary skill in the art.

The DDOs are used in the first major step 206 to create a view dependent piece-wise linear approximation of geometric objects (e.g. surfaces) in a scene. The space surrounding the scene is formed into discrete cells represented by grid 150. From the viewer position 152 of this example, a geometric object 154 in the forefront occludes another object 156. For occlusion culling purposes of the preferred embodiment of the present invention, the actual occluding geometry can be replaced by a simpler object 158, which is a subset of occluded grid edges. FIG. 4B shows the same scene of FIG. 4A from another viewer position 152'. From this viewer position 152', it is apparent that the subset of occluded grid edges 158', which act as approximate occluders, is dependent upon viewing direction.

FIG. 4C is an example of scene parameters considered in classification of a grid edge 160 for a grid cell 162. The grid edge 160 may be classified as a valid occluder for a given subset of viewer positions, collectively referred to herein as a visibility region represented by arc 164. For any grid edge 160 to be classified as a valid occluder, nearby, foremost geometry 166 must completely cut the visibility frustum represented by arc 168 into two portions. These two portions include one portion behind the occluder 166 that must contain the grid edge 160 and, a second portion in front of the geometry that contains a set of potential viewer positions. FIG. 4D shows a viewing direction discretization with respect to grid edge 170 of nearby grid cell 171. A determination is made whether grid edge 170 is a valid occluder for each of the subsets of determined discrete viewing directions.

Figure 5:
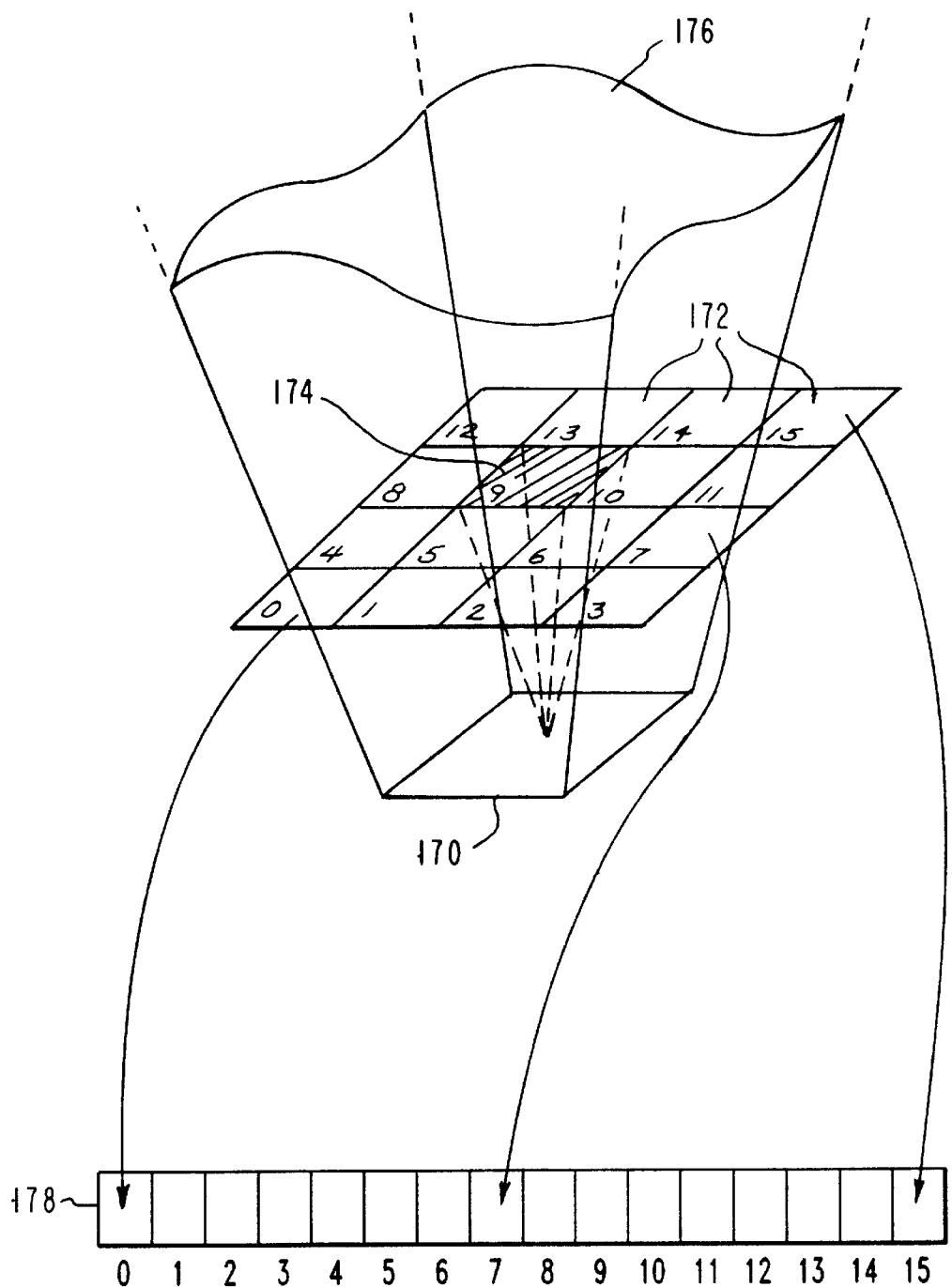
FIG. 5 is a block diagram of an occlusion data structure used to store occlusion information determined in DDO preprocessing.

The results of that determination in DDO preprocessing step 206 are stored in the DDO data structure, as represented in FIG. 5. Thus, for a given octree face 170, a set of possible viewing directions is subdivided into a fixed number of subsets 172, 16 in this example, numbered 0 to 15. These subsets 172 are each termed visibility regions, with reference to visibility region 164 in FIG. 4C. Accordingly, the set of visibility regions 172 each represent all viewpoints along all possible rays emanating from the center of the octree face 170 and intersecting visibility region 172. This set of rays forms a visibility cone. A single visibility cone is highlighted and the corresponding visibility frustum 176 for face 170 is highlighted. The visibility frustum 176 is obtained by convoluting the visibility region 174 with the octree face 170.

During preprocessing 206, each face 170 is checked to determine whether it is a valid occluder for each of the 16 visibility regions 172. Each visibility region 172 is mapped to one bit in a visibility bitmask 178. The visibility bitmask 178 includes bit locations corresponding to each of the 16 visibility regions. If a face 170 is a valid occluder, the bit of visibility bitmask 178 corresponding to that visibility region is set. However, if the face 170 is not a valid occluder, the same corresponding bit is cleared. Thus, during the rendering process 208, the bitmask 178 is used to determine whether a given octree face 170 is a valid occluder for the current viewer position.

Figure 6A:
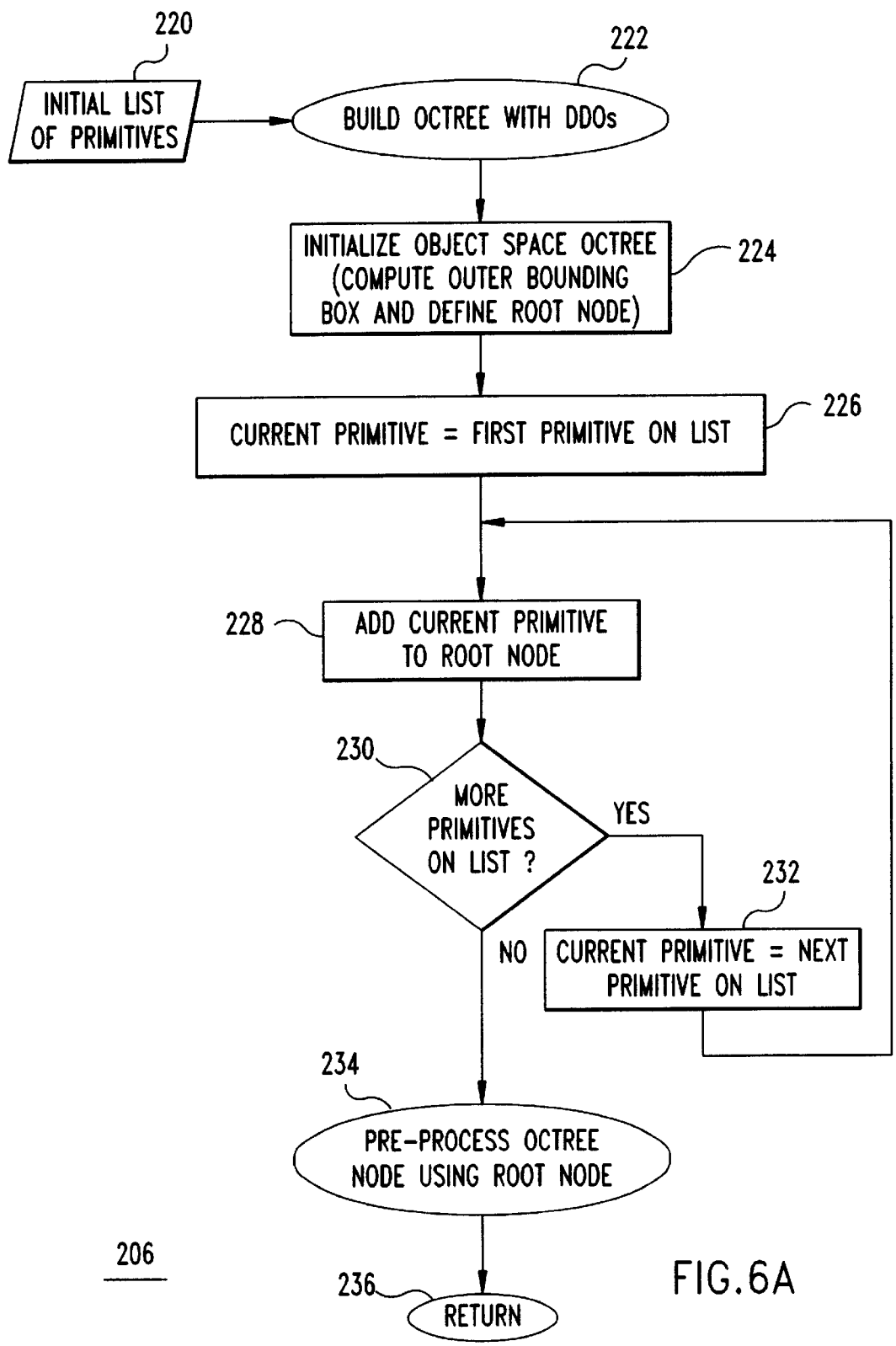
FIGS. 6A–B are flow charts of a preferred preprocessing occlusion process.
Figure 6B:
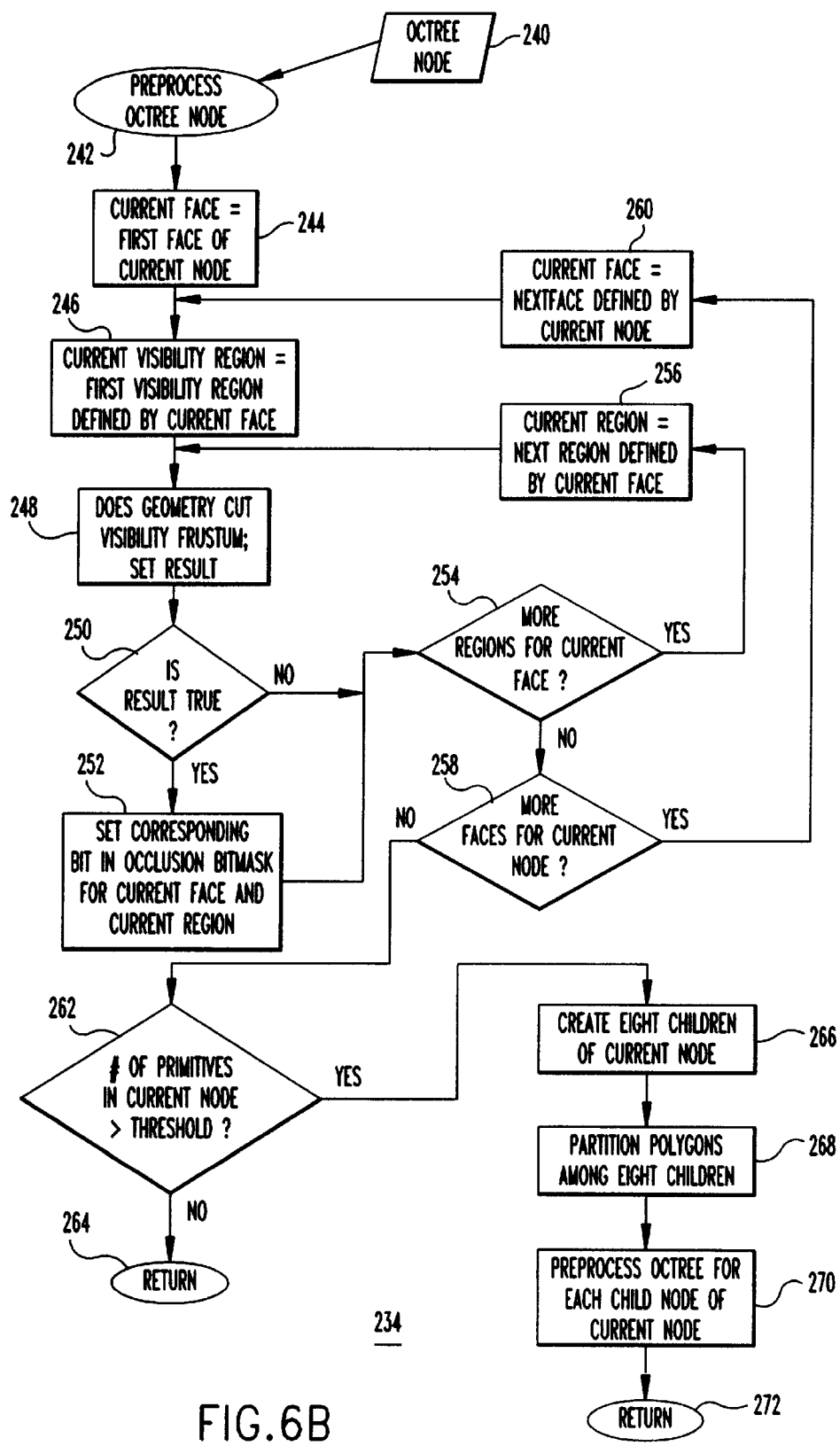

FIGS. 6A–B are flow charts for the first major step, the preprocessing occlusion process 206. First, in step 220, model geometry is input to the Build Octree with DDOs process 222. Within this process 222, each of the six faces of each of the octree cells are checked to determine whether they may be occluders from different viewpoints. As can be seen from the representative 2D example of FIGS. 4A–D, for a face of an octree cell to be a valid occluder from a specific viewpoint, the geometry within (or nearby) that cell must completely occlude the face from that specific viewpoint.

Next, in step 224, the octree object space is initialized by computing an axis-aligned bounding box of the input geometry 220 and by defining a root node. Then, each input primitive is assigned to the root node, iteratively.

In step 226, the first primitive is retrieved from the input list and tagged as the current primitive. Then, in step 228, the current primitive is added to the root node. In step 230, the input list is checked for any remaining primitives. If any primitives remain, then, in step 232, the next listed primitive is made the current primitive and steps 228, 230 and 232 are repeated until the list has been exhausted. Once, in step 230, it is determined that all of the primitives have been assigned, in the Preprocess Octree Node process step 234, the octree is constructed, one node at a time. Once the octree has been constructed, the preprocessing step 206 terminates in step 236.

FIG. 6B is a detailed flow chart of the Preprocess Octree Node process step 234. Initially, in step 242, a node 240 of the octree is identified as the current node, and passed as an input to the process. In step 244 the first of the six faces for the current node is identified as the node face being processed, the current_face. In step 246 a variable identifying the currently visible region (current_visibility_region) is set to point to the first visibility region identified by current_face. The current_face and current_visibility_region define the visibility frustum. Step 248 is a check for whether the current_face is a valid occluder by checking whether the scene geometry cuts the visibility frustum. In step 250 the result returned from the checking step 248 selects the next action.

If the result is true, then, in step 252, the result is stored in the corresponding bit of the occlusion bitmask 178, i.e. in the bit corresponding to the current_visibility_region in the occlusion bitmask 178 corresponding to the current_face. If, the result is false, then in step 254 a determination is made whether there are any more visibility regions 172 to test for the current_face. If the current face includes more regions 172, then, in step 256, the current_visibility_region is updated to point to the next region 172 in the current face 170 to be tested. The updated current_visibility_region is, then, passed to step 248, where the current face 170 is checked, again and, in step 250, the result of the check is tested again.

So, returning to step 248, the current_face is checked to determine if it is a valid occluder for the updated current_visibility_region and the result of that check is used in step 250 to select whether to set a bitmask bit in step 252 or to check for more visibility regions in step 254. When in step 254, it is determined that all visibility regions have been tested for the current_face, then, in step 258, the current node is checked to determine if there are any untested faces remaining for that node. If there are additional faces and, until the last face for the current node is encountered, in step 260, the current_face is set to point to the next face. Then, returning to step 246, the current_visibility_region is reset to point to the first visibility region of the new face and processing continues for that new face.

However, once in step 258, the last face is found to have been tested, then, in step 262, the number of primitives assigned to the current node is tested against a predefined threshold. If, in step 262, the number of primitives does not exceed the threshold, then, the current node is considered a leaf of the octree and the Preprocess Octree Node step 236 terminates at step 264. Otherwise, if in step 262, it is determined that the number of primitives in the current node exceeds the threshold value, then in step 266, the current node is spatially subdivided into children, preferably eight. Then, in step 268, the primitives (polygons) of the current node are partitioned among the eight children created in step 266. Then, in step 270, the Preprocess Octree Node process 236 is recursively called, returning to 240, for each of the eight children of the current node. Once the eight (one for each of the eight children) recursive calls in step 270 are completed, the Preprocess Octree Node process 236 is terminated in step 272 for the current node.

Although there are several possible approaches to determining if nearby geometry occludes a face from a particular viewpoint, the preferred method is as follows:

A. The face is identified as a candidate occluder when the face can be seen from the halfspace containing the octree cell to which the cell belongs.
B. The solid angle spanning the halfspace is partitioned into a number of visibility regions.
C. For each visibility region, the "visibility frustum", i.e., the polyhedron obtained convolving the face with the visibility cone is considered; the visibility frustum contains all possible rays to every point on the face from a potential viewpoint in the region.

D. Determine if there exists a connected collection of polygons, in the geometry within and nearby the cell, that intersects every possible ray, or, equivalently, that "cuts" the visibility frustum into two parts; one part containing the face, the other part containing all potential viewpoints along rays from the center of the face through the visibility region.

FIGS. 7A–D are flow charts of step 248, showing how an octree face is checked for being a valid occluder for a given collection of viewpoints, with reference again to FIGS. 4A–D. A determination is made whether geometry in the neighborhood of the octree face partitions the visibility frustum 176, relative to a visibility region 174, into two parts; one part containing the face 170, the other part containing all potential viewpoints in the frustum at a distance larger than a fixed threshold from the face. This distance may be selected to be two times the size of the octree cell currently visited. Thus, the visibility frustum is clipped with a plane parallel to the face and at a distance equal to two times the current cell size. The resulting clipped view frustum is a polyhedron bounded by the octree face, the opposite clipping face, and side faces. The geometry must cut the frustum in such a way that it intersects with any possible segment connecting a point on the octree face to a point on the clipping face. If such a partition can be identified, then the octree face can act as a valid occluder for the set of viewing points represented by the visibility region.

Accordingly, in step 282, an initial polygon is sought within the cell. Step 284 is a test to determine if an initial polygon was found. If not, a no is returned. Otherwise, if an initial or, seed polygon is found, then in step 286, the octree face is tested to determine whether it is a valid occluder. This valid occluder check begins by traversing neighboring polygons until a neighboring polygon is encountered that extends outside of the visibility frustum. As each neighboring polygon is traversed, a cumulative boundary, patched together from boundaries of traversed polygons, is updated. Once it is determined that all neighboring polygons within the visibility frustum have been identified the boundary of the connected patch of visited polygons is checked to determine if the boundary completely surrounds the visibility frustum. If the patch boundary completely surrounds the visibility frustum, then the geometry nearby the octree face cuts the visibility frustum and the octree face is occluded. Thereafter, the octree face may be treated as an occluder.

Figure 7A:
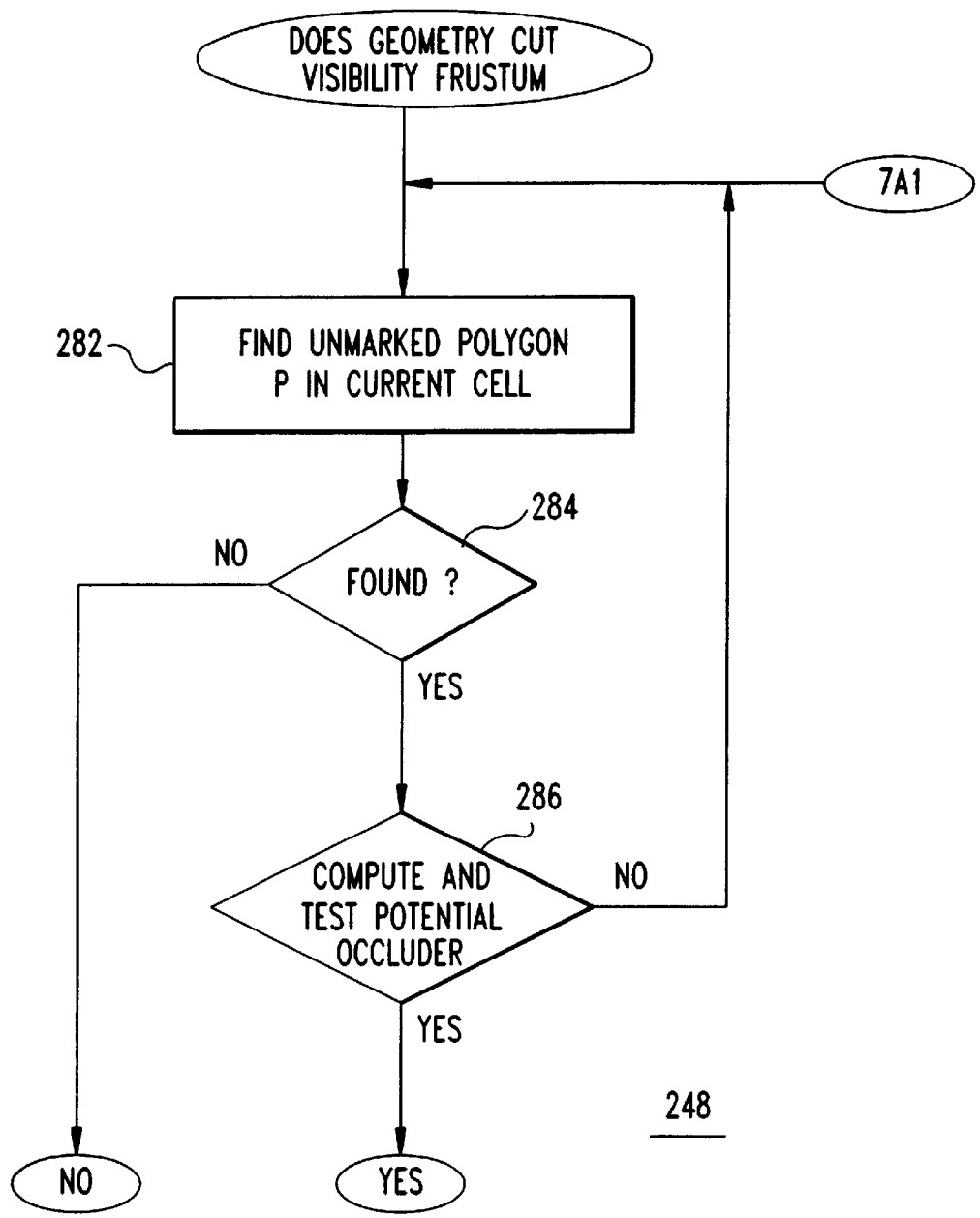
FIGS. 7A–D are flow charts of a preferred method to determine whether an octree face is a valid occluder for a given collection of viewpoints.
Figure 7B:
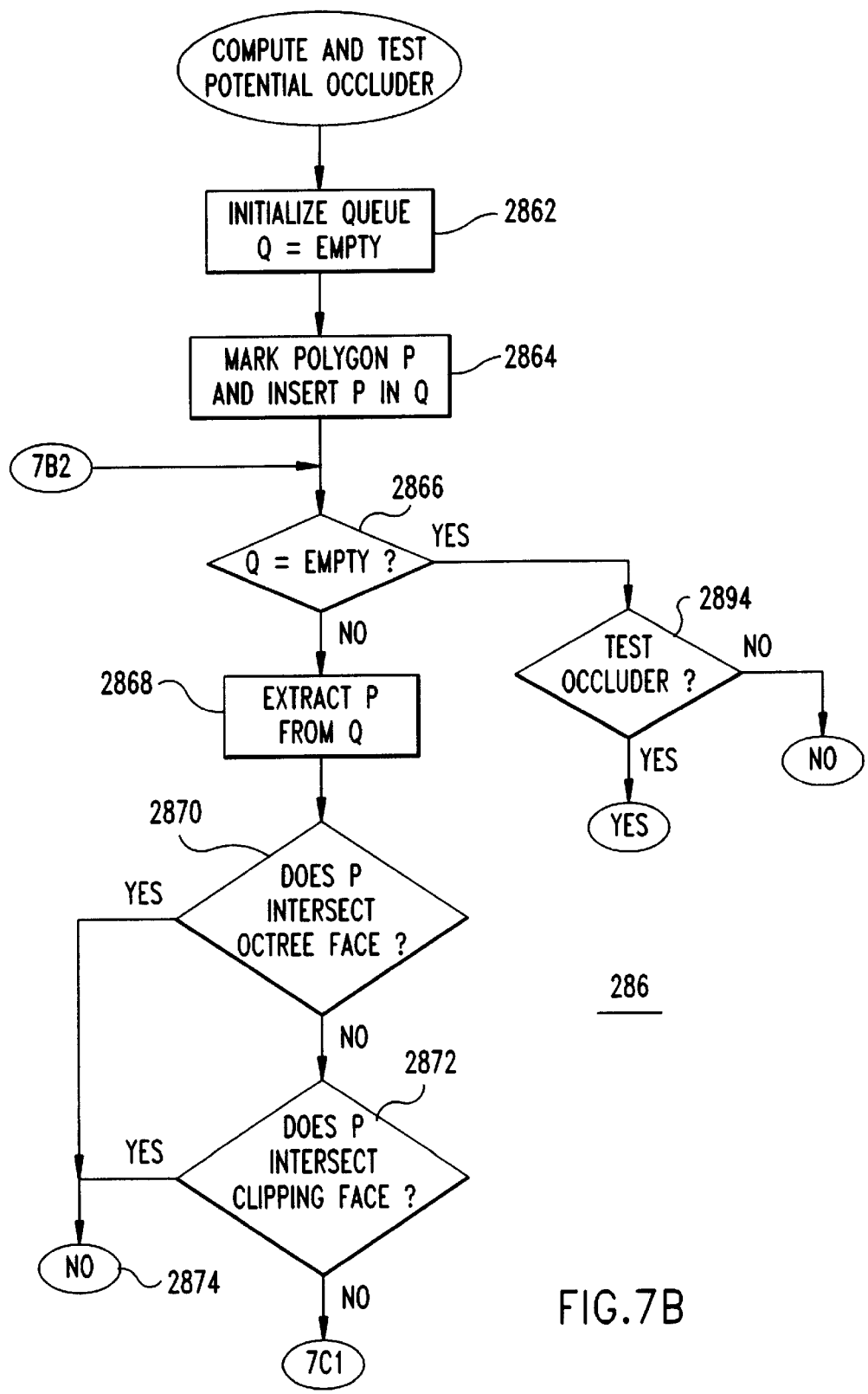
Figure 7C:
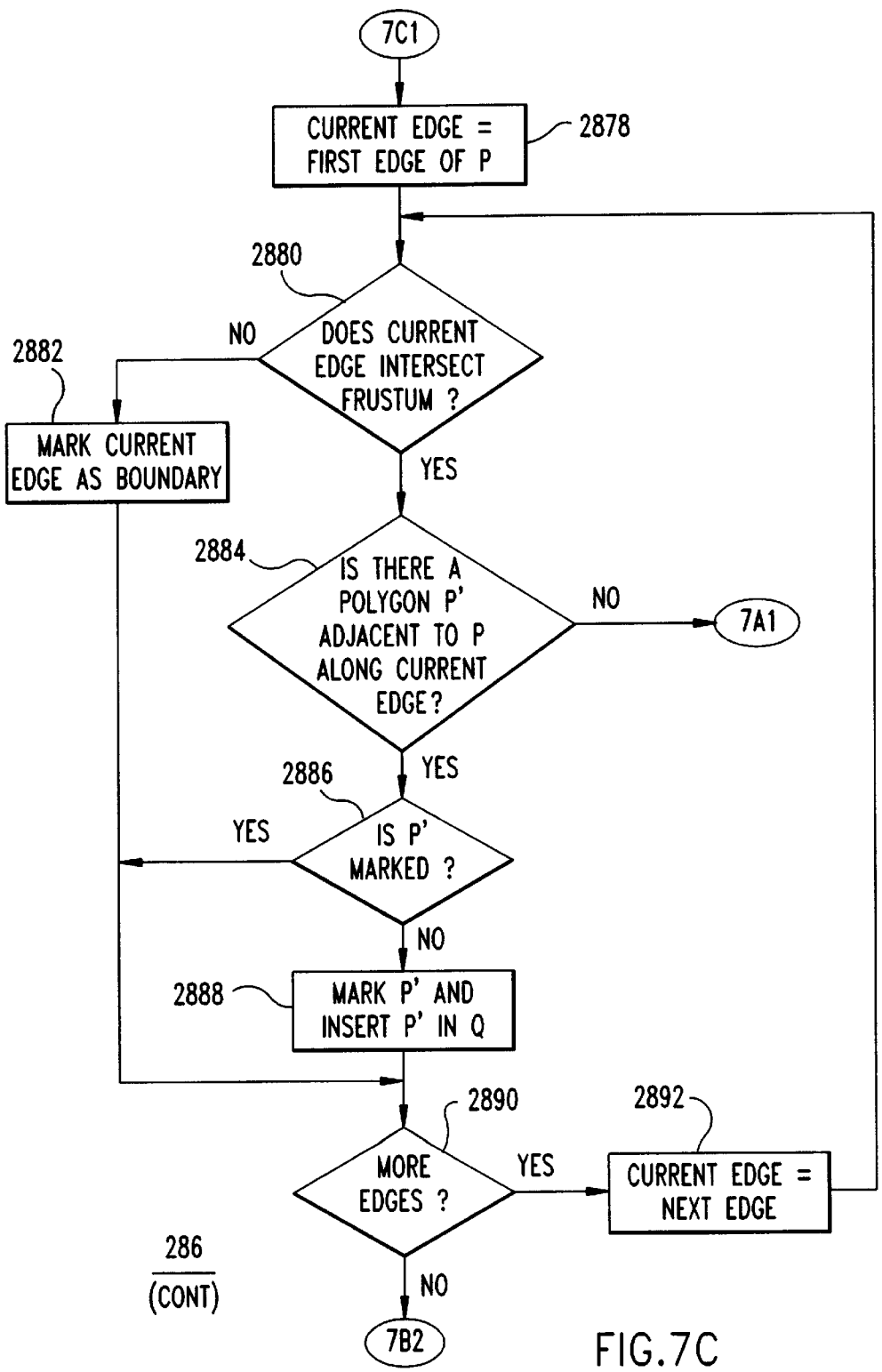
Figure 7D:
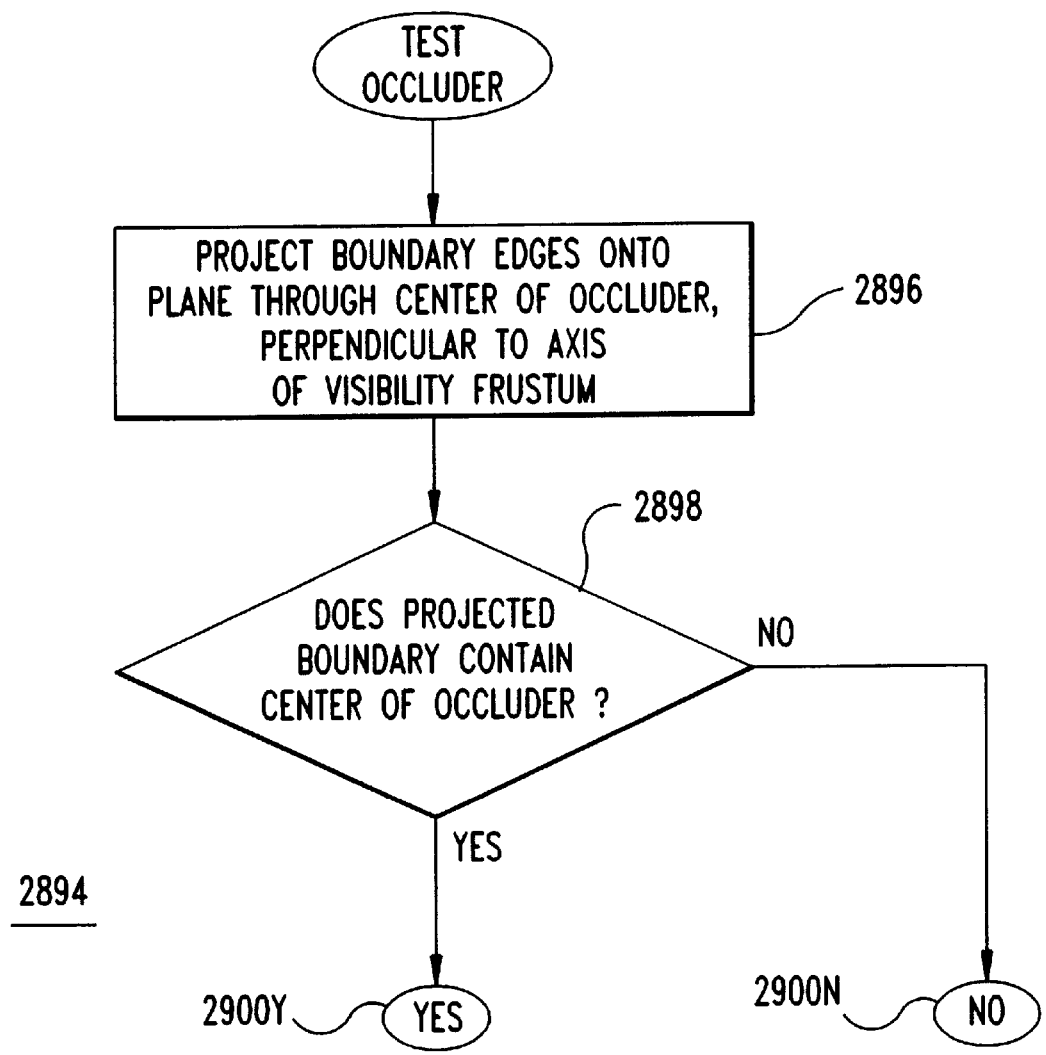

FIGS. 7B–D show the steps in computing and testing potential occluding geometry of step 286. As can be seen in FIG. 7B, first, in step 2862, a queue data structure is initialized to empty. Then, in step 2864 the seed polygon P is marked as used and inserted into the queue, which begins traversal of neighboring geometry by following polygon to polygon adjacency relationships. After determining in step 2866 that the queue is not empty, a polygon P is extracted from the queue in step 2868. In step 2870 the polygon is checked to determine whether it intersects the octree face and, if not, then in step 2872, whether it intersects the clipping face. If it is determined that the polygon intersects the octree in step 2870 or the clipping face in step 2872, then the polygon cannot be part of a patch of geometry that cuts the visibility frustum as described hereinabove (i.e., partitioning the visibility frustum into two parts relative to the visibility region), and, NO is returned in step 2874. Otherwise, beginning in step 2878 all edges of the current polygon are considered. Each edge is checked in step 2880 to determine whether it intersects the viewing frustum. If the edge does not intersect, it is entirely external to the visibility frustum and, in step 2882, it is marked as a boundary edge. Also, if the edge does intersect, in step 2884, a check is made to determine whether there is a polygon adjacent to the edge. If there is no such polygon, then a connected patch of polygons that entirely partitions the frustum cannot be built, NO is returned and, returning to step 282, a next unmarked polygon is identified.

However, if it is determined in step 2884 that an adjacent polygon exists, then proceeding to step 2886 in FIG. 7C, the polygon is checked as to whether it has been visited and marked. If it has not, then in step 2888, it is marked and enqueued for further processing, and another edge of the polygon P is considered in step 2892, and processed in steps 2880–2888, until it is determined, in step 2890, that all edges of P have been considered. Then, returning to step 2866, the queue is checked and, in step 2868 another polygon is extracted from the queue to process it.

When, in step 2866, it is determined that the queue is empty, in step 2894 as shown in detail in FIG. 7D, the collection of edges marked as boundary edges (the boundary of the patch of polygons built by the algorithm) are checked to determine whether the patch boundary surrounds the visibility frustum. So, starting in step 2896, all boundary edges are projected onto a plane that passes through the center of the octree face, and is perpendicular to a line through the octree and clipping face centers. Then, in step 2898, a simple point-in-polygon test is used to determine whether the octree face center lies within the projected set of edges. The test returns YES 2900Y if the test is successful and NO 2900N otherwise. Therefore, after visiting the cell in the front-to-back ordering, the face of the octree cell may be substituted for and treated as the occluder, rather than the actual more complex geometry. Accordingly, future visibility queries are much faster using this much simpler occluder.

It should be noted that the substituted faces of the octree act as conservative occluders, i.e., they occlude a subset of what is occluded by the actual geometry. This conservative occluder property guarantees that culling the geometry occluded by the octree faces will not introduce visibility artifacts in the rendered scene. On the other hand, increased computational speed has been traded for culling only a subset of the occluded geometry.

Further, the occlusion information computed in the pre-processing phase 206 can be used immediately by a run-time rendering process or, saved to a DDO file for subsequent use. Such a DDO file would contain a description of the octree hierarchy. For each octree face, a bitmask 178 is stored wherein each bit corresponds to one region of the solid angle described herein above. As further described, each bit is set to one if the corresponding face is a valid occluder for the viewpoints in that region and, zero otherwise.

Figure 8A:
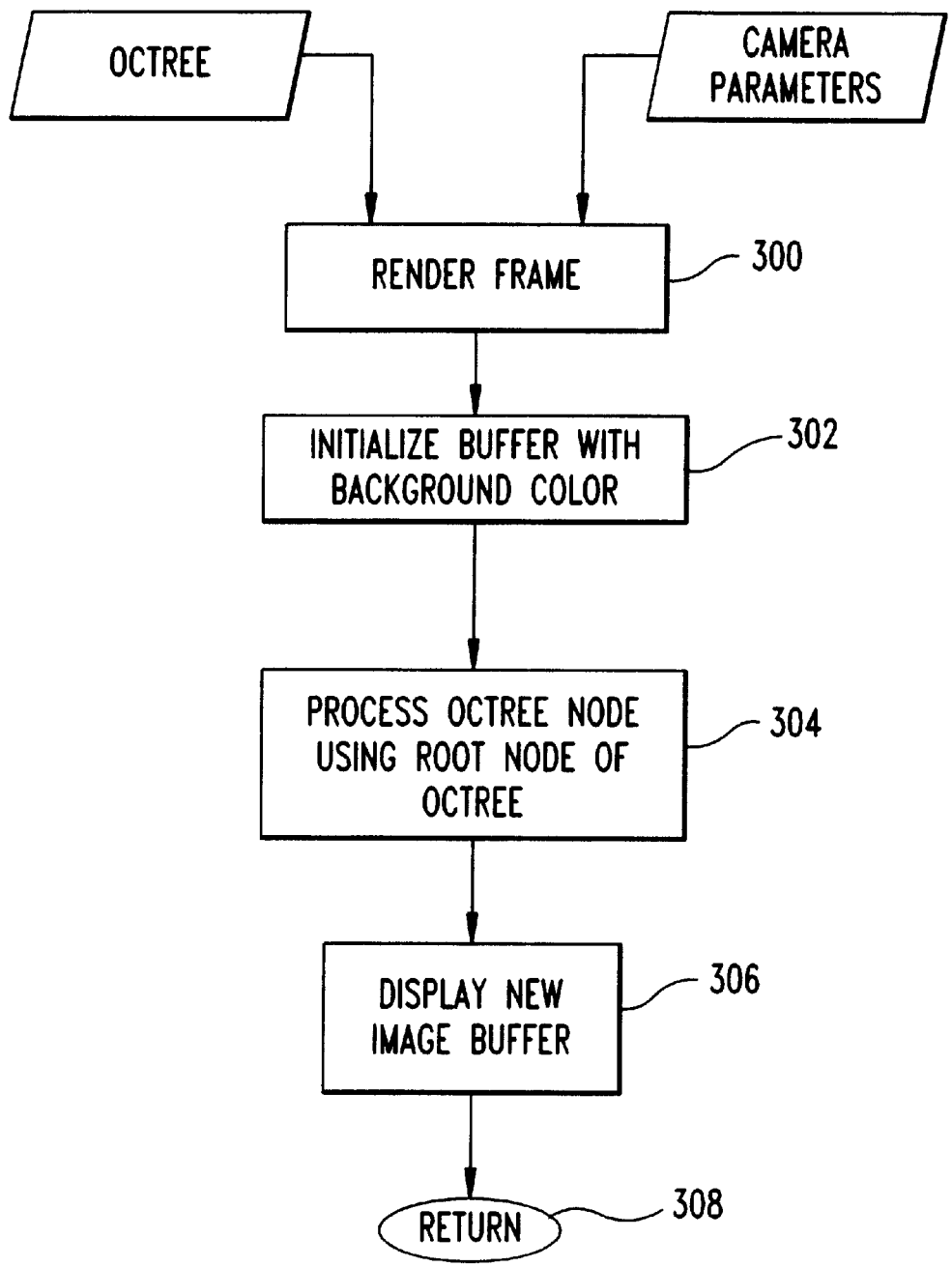
FIGS. 8A–C are flow charts of a preferred run-time culling process.

FIG. 8A is a flow chart of the Render Frame process of step 208, also referred to herein as the run-time culling process. First, in step 300, the octree including the DDO information and the current camera parameters are input. Then, in step 302, the image buffer is initialized with a background color. Next, in step 304, the octree is traversed to compute which primitives are rendered and the image buffer is displayed 306 on the computer display 134. The octree is traversed in step 304 by executing a recursive function, the Process Octree Node function described hereinbelow, using the root node of the octree as an input parameter. Then, in step 308, the Render Frame process terminates.

Figure 8B:
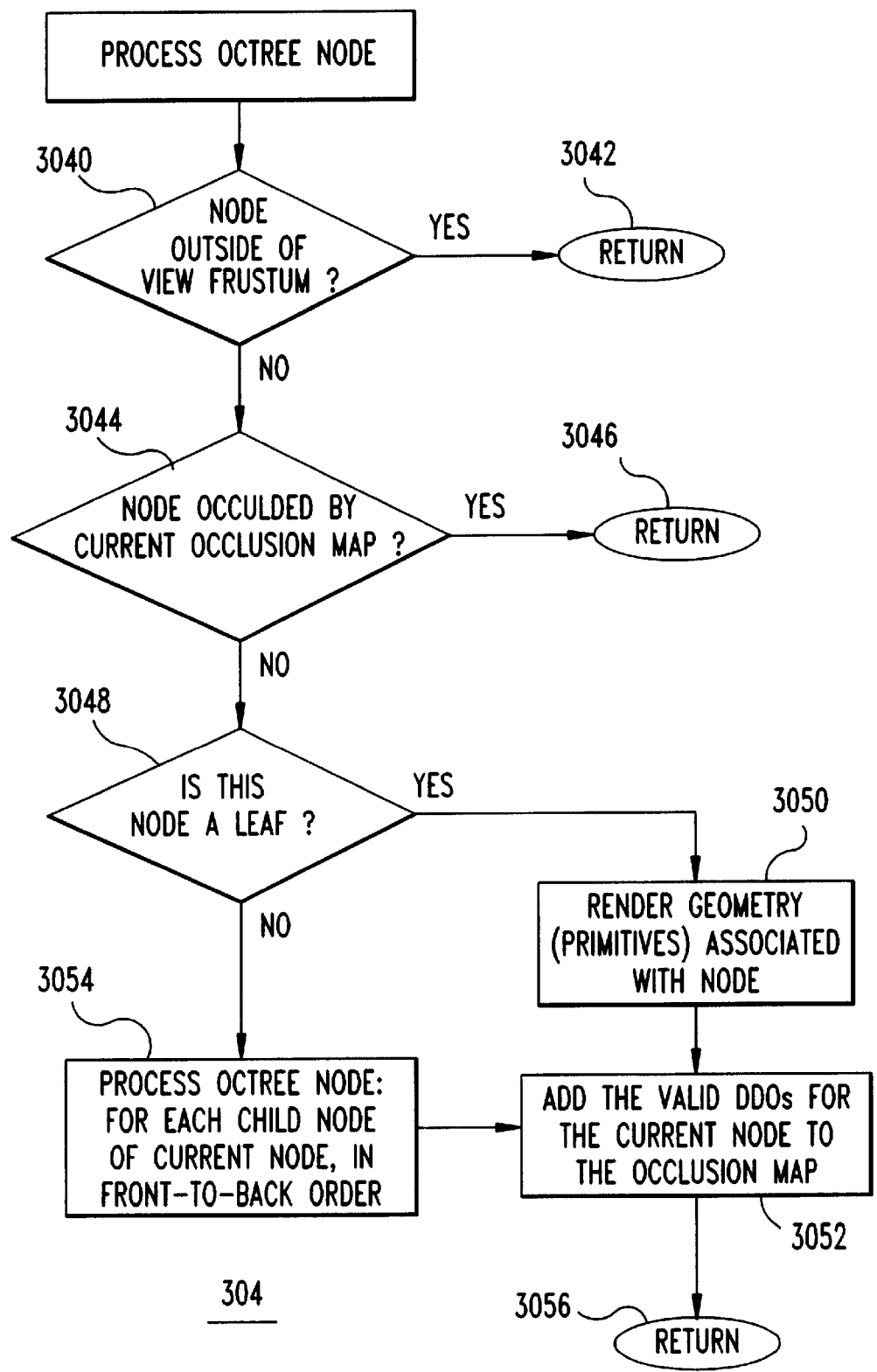

FIG. 8B is a flow chart of a preferred Process Octree Node procedure 304, which begins by traversing the previously constructed octree in a top-down front-to-back order. First, in step 3040, during the traversal, each processed node of the octree is tested to determine if it lies outside the view frustum. If the node lies outside of the view frustum, then, it need not be considered, because it is not visible to the viewer and, accordingly, in step 3042, the Process Octree Node procedure is terminated. If, instead, the node intersects the view frustum, then in step 3044 it is determined whether the node is occluded using the current set of valid occluders in a cumulatively formed occlusion map. The occlusion map is updated at each point of the traversal. If the node is occluded, then all of the primitives assigned to that node and all of the primitives assigned to children of that node cannot be seen from the current viewpoint, and need not be considered any further. So, if the node is occluded, then in step 3046, the Process Octree Node procedure is terminated.

However, if the node is not occluded, then, in step 3048, a determination is made whether the node is a leaf, i.e., a childless octree node. If the node is a leaf, in step 3050, the primitives that are assigned to it are rendered; and, in step 3052, the valid occluders, or DDOs, as determined by the occlusion bitmask 178 for the current node, are added to the occlusion map. If the node is not a leaf, then in step 3054, the Process Octree Node procedure is called, recursively, for each of the children of the current node, in front-to-back order based upon the current viewpoint.

Thus, by visiting the octree cells in the correct front-to-back order, the previously substituted occluders, essentially, replace complex model geometry with very simple rectangles. Essentially, the result is a three dimensional surface analogous to the two dimensional grid edges 158, 158' of FIGS. 4A–B. Accordingly, it is much easier to check whether a subsequently processed octree cell is occluded or not. Upon completion of the recursion, in step 3052, the valid occluders are added to the occlusion map. Finally, in step 3056, once any valid occluders have been added, the Process Octree Node procedure is terminated.

Figure 8C:
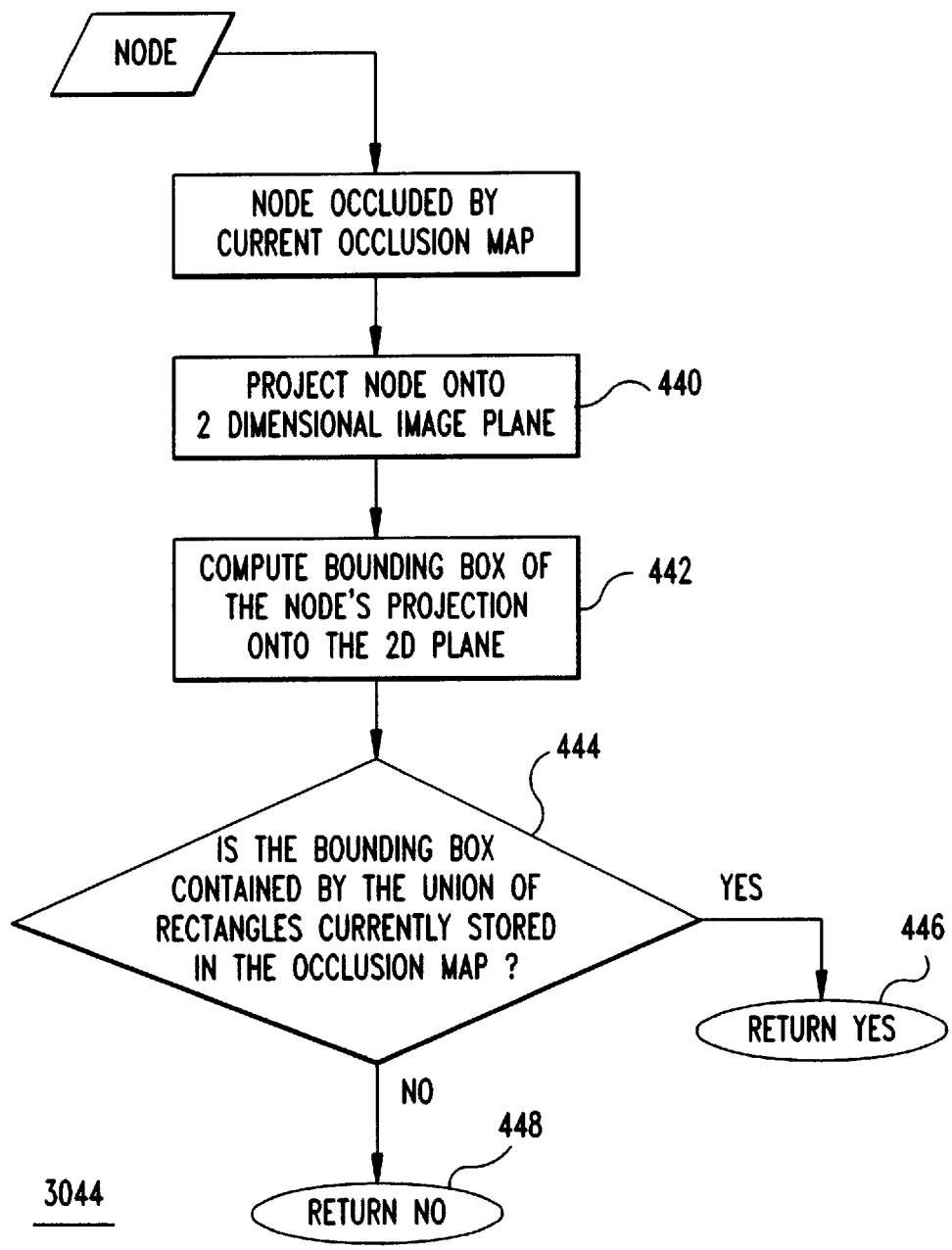

FIG. 8C is a flow chart of the node testing function 3044 that tests whether an octree node is occluded by a current occluder, listed in the occlusion map. First, in step 440, the node is projected onto a two-dimensional image plane that is parallel to one of the three coordinate planes. Current viewing parameters determine which of the three coordinate planes is used. Preferably, the selected plane maximizes the area of projection with respect to the current viewpoint and view direction. Next, in step 442, the bounding box of the node's projection is computed. Then in step 444, the bounding box is compared against occluders currently stored in the occlusion map. If, in step 444, the bounding box is found to be completely contained within the union of occluders, then it is occluded and is not visible from the current viewpoint. Accordingly, in step 446, a confirmation that the node is occluded is returned. Otherwise, in step 448, an indication that the node is not occluded by the current occlusion map is returned.

Thus, for each viewpoint, the current set of valid occluders is maintained in a 2-dimensional data structure. The method of the present invention projects the 3D occluders onto a 2D plane, parallel to one of the three coordinate axes. Previously complex visibility queries, therefore, have been simplified to checking an axis-aligned rectangle against a collection of axis-aligned rectangles. Accordingly, in the preferred embodiment, this simplification has been implemented using three different data structures: a quadtree, a uniform quadtree, and a hierarchy of uniform grids (HUG).

ADVANTAGES OF THE INVENTION

The method of the present invention does not require special or advanced graphics hardware typically required by prior art methods. Further, after computing occluders, simple polygons replace arbitrarily complex input models. Thus, determining whether geometry is visible given what has already been rendered can be computed very quickly.

The method of the present invention is especially effective when the scene includes many small polygons, such as, for example, in scenes approximating curved surfaces such as the body of a car. Prior art methods would not find small collections of polygons that occlude a significant portion of scene geometry, or would consider a large number of polygons, resulting in a slow, computation-intensive culling process, thereby reducing frame rate. The method of the present invention replaces the finely tessellated surface with a simpler collection of octree faces during preprocessing, allowing the run time culling algorithm to perform at higher frame rate.

It should also be noted that preprocessing according to the preferred embodiment of the present invention can be applied to the temporally coherent conservative visibility method of Coorg and Teller and the hierarchical occlusion map method, described hereinabove. For the method of Coorg and Teller, the large occluder selection is performed on the DDOs rather than on the original geometry. For the method of HOM, the DDOs, rather than the original geometry, is rendered for occlusion testing.

While the invention has been described in terms of preferred embodiments, those skilled in the art will recognize that the invention can be practiced with modification within the spirit and scope of the appended claims.

We claim:

1. A computer implemented method for image processing, said method comprising the steps of:
   a) preprocessing a scene to form an octree data structure, a subset of cell faces of the octree data structure being marked as valid occluders for a collection of viewpoints; and
   b) rendering an image according to said octree data structure by traversing the octree data structure in a top-down and front-to-back order, determining if each traversed octree cell is occluded by previously encountered occluders, rendering geometry associated with those octree cells determined not occluded, and adding valid occluders for said each cell to an occlusion map once children of said each cell have been traversed, only primitives associated with visible octree nodes being rendered.

2. A computer method, as in claim 1, wherein the occlusion map is a two-dimensional data structure capable of maintaining the union of projected valid occluders.

3. A computer method as in claim 2 wherein in the step (b), the octree is traversed at run time.

4. A computer method, as in claim 1, wherein in the preprocessing step (a), the octree data structure is recursively constructed comprising the steps of:
   i) determining a bounding box of input model geometry; and
   ii) associating the bounding box and the input model geometry with a root of the octree.

5. A computer method as in claim 4, wherein in the preprocessing step (a), the cell faces marked as valid occluders are identified comprising the steps of:
   iii) determining whether geometric primitives located between an identified set of viewing positions and a cell face partitions a visibility frustum, thereby occluding the cell face from the set of viewing positions; and
   iv) setting a corresponding bit in an occlusion bit mask for each occluded cell boundary, said occluded cell boundary being identified as a valid occluder for said set of viewing positions.

6. A computer method as in claim 5, wherein in the preprocessing step (a), identifying the cells marked as valid occluders further comprises:

v) for each octree node including a number of geometric primitives exceeding a maximum number of geometric primitives, subdividing the node into children, associating intersecting geometric primitives with each of said children, and determining whether each face of said children is a valid occluder.

7. A computer method as in claim 6, wherein in the preprocessing step (a), identifying the cells marked as valid occluders further comprises:

vi) repeating steps iii–v until each face of every octree node and every one of said children have been determined to be valid occluders or non-occluders.

8. A computer method as in claim 7, wherein the rendering step (b) comprises the steps of:

i) identifying nodes within a current view frustum;

ii) determining whether the identified nodes are occluded by a valid occluder; and iii) for each leaf node determined not to be occluded, rendering geometry associated with said each node.

9. A computer method as in claim 8, wherein after the determining step (ii), further comprising the steps of:

iia) determining whether said node is a leaf node; and iib) for each node determined not to be a leaf node, processing each child of said each node in front to back order.

10. A computer implemented method for determining which geometry of a model is occluded by geometry closer to a viewer, said method comprising the steps of:

a) recursively constructing an octree data structure corresponding to an input model geometry;

b) traversing the octree data structure and marking a subset of octree cell faces as valid occluders for a collection of viewpoints, said valid occluders being identified by testing whether the neighboring geometry occludes the octree cell face for said collection of viewpoints; and c) traversing the octree data structure at run-time in a top-down and front-to-back order, determining if each current octree cell is occluded by previously encountered occluders, rendering the geometry associated with those octree cells which are determined not occluded, and adding any valid occluders for the current cell to an occlusion map once children of said current octree cell have been visited.

11. A computer method as in claim 10, wherein the step (a) of recursively constructing the octree data structure comprises the steps of:

i) computing a bounding box of the input model;

ii) associating the bounding box and all geometry of the input model with the root of the octree; and iii) if the number of geometric primitives associated with the current node is larger than a maximum, then, subdividing the current node into eight children, the eight children being associated with intersecting geometries, and recursively processing each of said eight children.

12. A computer method, as in claim 10, wherein one or more of the valid occluders are view-dependent occluders determined in step (b), view-dependent occluders being determined by steps comprising:

i) identifying a face of an octree cell as a candidate occluder when said identified face is visible from a halfspace containing said octree cell;

ii) partitioning a solid angle spanning said halfspace into a number of discrete regions;

iii) forming a visibility frustum by convolving said candidate occluder face with a visibility cone for each region, said visibility frustum containing all rays from a viewpoint in said region to every point on the candidate occluder face;

iv) identifying every valid occluder for each discrete region by determining if there is a connected collection of polygons for said each region that cuts the visibility frustum into two parts, one of said parts containing said face, the other part containing all potential viewpoints within the visibility region beyond a specified dustance; and v) storing identified valid occluders in memory.

13. A computer method, as in claim 12 in the identifying step (iv), wherein determining if the visibility frustum is cut into two parts by neighboring geometry comprises the steps of:

A) selecting a seed polygon within the cell;

B) traversing connected polygons beginning at the seed polygon until untraversed connected polygons remain within the visibility frustum; and C) determining whether the boundary of the traversed polygons surrounds the visibility frustum thereby partitioning the visibility frustum into two parts, a first part containing the face of the said octree cell and, a second part containing all potential viewpoints within the visibility cone beyond a specified distance.

14. A computer method, as in claim 13, wherein view-dependent occluders are stored within a bitmask, each bit of said bitmask indicating whether a corresponding octree face is a valid occluder in a corresponding set of viewing directions.

15. A computer method, as in claim 10, where the occlusion map is a two-dimensional data structure capable of maintaining the union of projected valid occluders.

16. A computer method, as in claim 15, where the valid occluders are rectangles.

17. A computer method, as in claim 15, wherein the occlusion map is a two-dimensional data structure.

18. A computer method, as in claim 15, wherein the two-dimensional data structure is a quadtree.

19. A computer method, as in claim 15, wherein the two-dimensional data structure is a hierarchy of uniform grids.

20. A computer method, as in claim 10, wherein the run-time traversing step (c) further comprises determining whether a current octree cell is occluded by previously added occluders by the steps of:

i) projecting a bounding extent of each octree cell onto the image plane;

ii) comparing the projected bounding extent against the current occlusion map; and iii) determining if the octree cell is occluded by determining whether the projected bounding extent is completely contained within a union of previously added occluders.

21. A computer program product for selecting objects in a scene for rendering on a display, said computer program product comprising a computer usable medium having computer readable program code thereon, said computer readable program code comprising:

computer readable program code means for preprocessing a scene to recursively form an octree data structure; and computer readable program code means for rendering an image by traversing the octree data structure in a top-down and front-to-back order, a subset of octree cell faces being marked as valid occluders for a collection of viewpoints, and as the octree data structure is traversed, determining if each traversed octree cell is occluded by previously encountered occluders, geometry associated with those octree cells determined not occluded being rendered, valid occluders for said each cell being added to an occlusion map once children of said each cell have been traversed, only primitives associated with visible octree nodes being rendered, octree nodes occluded by said marked valid occluders with respect to a current viewpoint not being visited.

22. A computer program product as in claim 21, further comprising: comprising:

computer readable program code means for testing whether the neighboring geometry occludes the octree cell face for said collection of viewpoints and marking any occluded face as a valid occluder.

23. A computer program product as in claim 22, wherein the computer readable program code means for preprocessing the scene comprises:

computer readable program code means for computing a bounding box of the input model;

computer readable program code means for associating the bounding box and all of the input model geometry with the root of the octree; and computer readable program code means for determining if a number of geometric primitives associated with the current node is larger than a maximum then, subdividing the current node into eight children, the eight children being associated with intersecting geometries, and recursively processing each of said eight children.

24. A computer program product as in claim 23, wherein the computer readable program code means for rendering the image comprises:

computer readable program code means for projecting a bounding extent of each octree cell onto the image plane;

computer readable program code means for comparing a projected bounding extent against the current occlusion map; and computer readable program code means for determining whether the projected bounding extent is completely contained within a union of previously added occluders thereby occluding the octree cell.

25. A computer program product as in claim 24, wherein the computer readable program code means for traversing the octree data structure comprises:

computer readable program code means for identifying a face of an octree cell as a candidate occluder when visible from a halfspace containing said octree cell;

computer readable program code means for partitioning a solid angle spanning said halfspace into a number of discrete regions, each of said regions forming a visibility cone;

computer readable program code means for convolving said face with each visibility cone to form a visibility frustum, said visibility frustum containing all rays from a viewpoint in said visibility cone to every point on the face;

computer readable program code means for identifying any valid occluder for each visibility cone by determining if there is a connected collection of polygons for said each visibility cone that cuts the visibility frustum into two parts, one of said parts containing said face, the other part containing all viewpoints within the visibility cone beyond a specified distance; and computer readable program code means for causing said identified valid occluders to be stored in memory.

26. A computer program product as in claim 25, wherein the computer readable program code means for identifying any valid occluder comprises:

computer readable program code means for selecting a seed polygon within the cell;

computer readable program code means for traversing connected polygons beginning at the seed polygon until untraversed connected polygons remain within the visibility frustum; and computer readable program code means for determining whether the boundary of the traversed polygons surrounds the visibility frustum thereby partitioning the visibility frustum into two parts, a first part containing the face of the said octree cell and, a second part containing all potential viewpoints within the visibility cone.

27. A computer program product as in claim 26, further comprising:

computer readable program code means for associating view-dependent occluders with bits in a bitmask, each bit of said bitmask indicating whether a corresponding octree face is a valid occluder in a corresponding set of viewing directions.

* * * * *

UNITED STATES PATENT AND TRADEMARK OFFICE
CERTIFICATE OF CORRECTION

PATENT NO. : 6,574,360 B1  
DATED : June 3, 2003  
INVENTOR(S) : Bernadini et al.

It is certified that error appears in the above-identified patent and that said Letters Patent is hereby corrected as shown below:

Column 1,
Line 53, please delete "yet" and insert -- Yet --.

Signed and Sealed this

Twenty-fourth Day of February, 2004

JON W. DUDAS
*Acting Director of the United States Patent and Trademark Office*